(No Model.) 3 Sheets—Sheet 1.
H. E. FOWLER.
METHOD OF WELDING METALS BY ELECTRICITY.
No. 434,017. Patented Aug. 12, 1890.
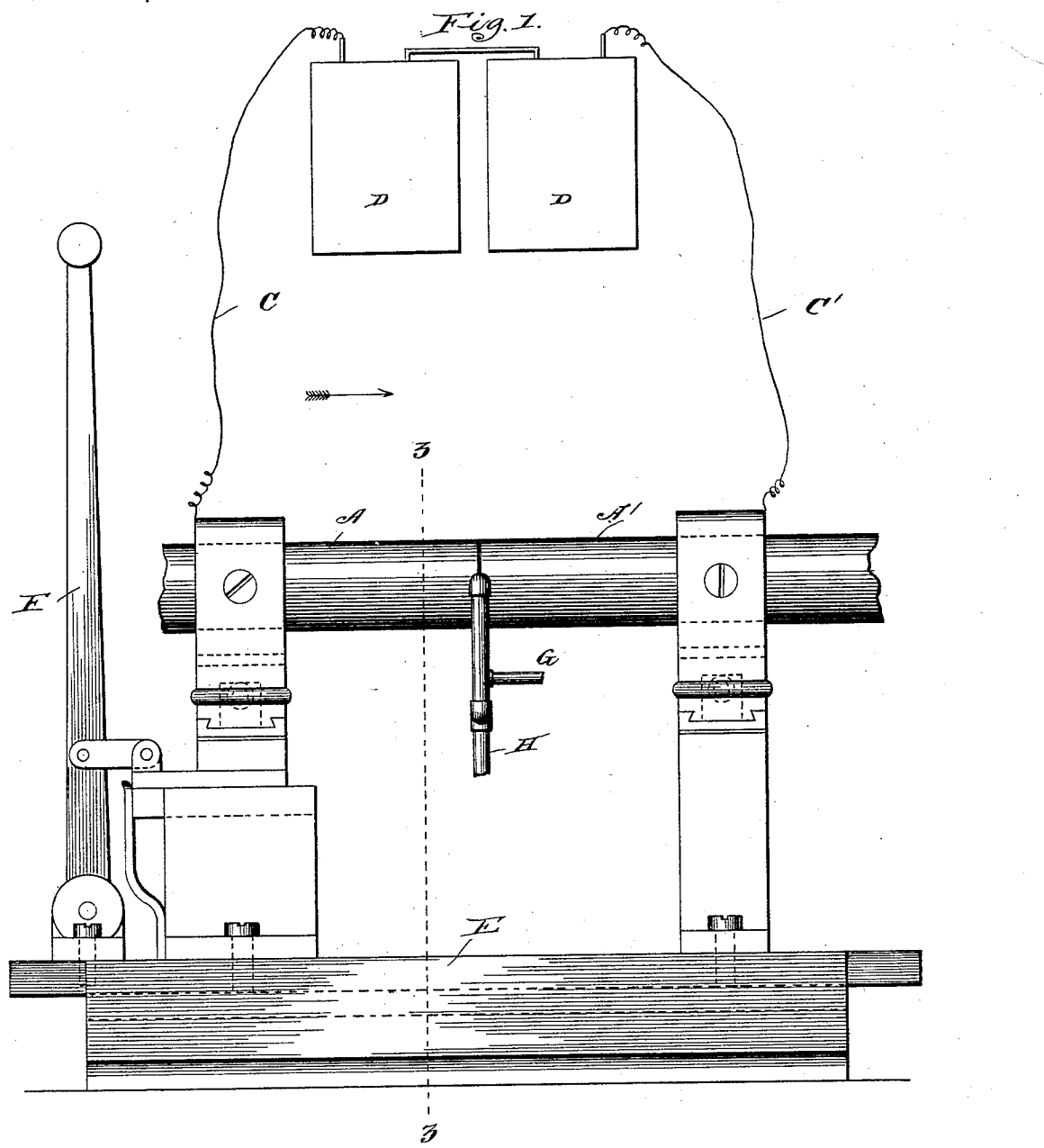

(No Model.)
H. E. FOWLER.
METHOD OF WELDING METALS BY ELECTRICITY.
No. 434,017. Patented Aug. 12, 1890.
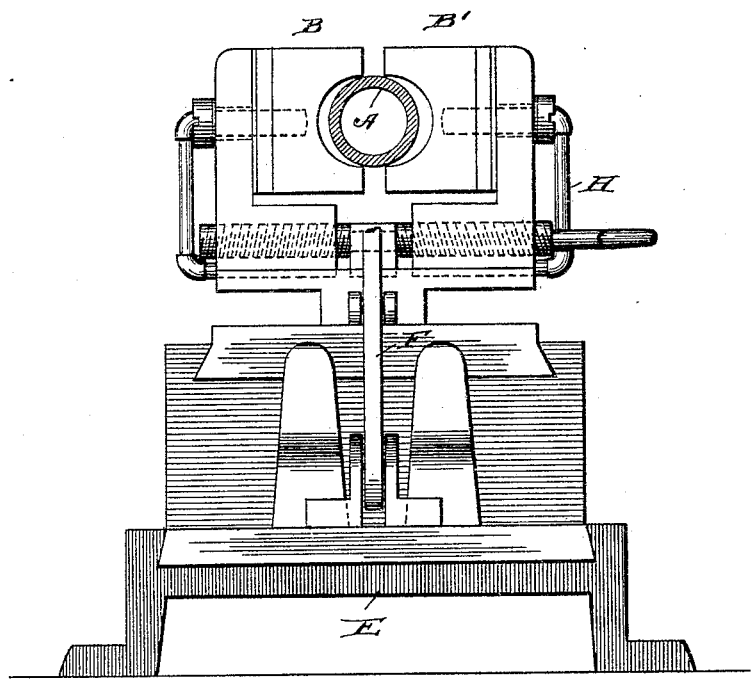

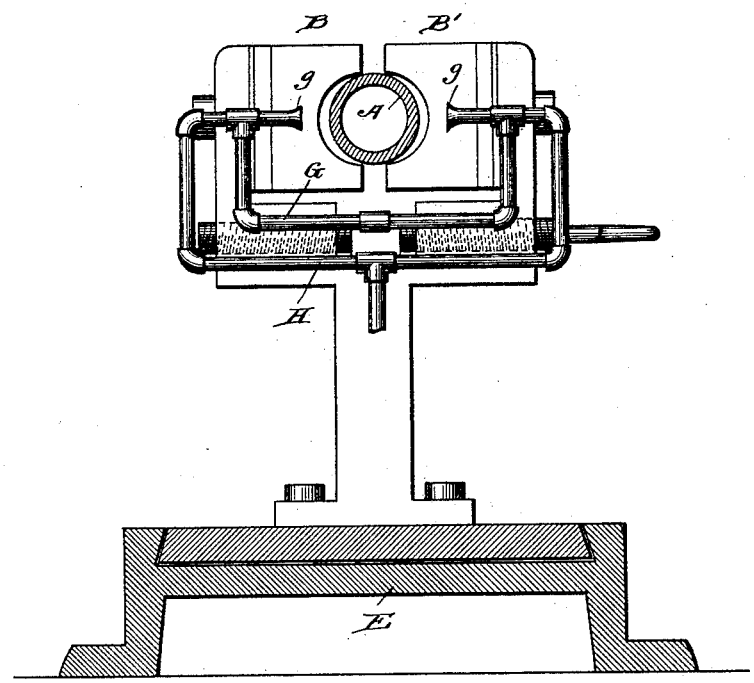

UNITED STATES PATENT OFFICE.

HERBERT E. FOWLER, OF NEW HAVEN, CONNECTICUT, ASSIGNOR OF ONE-HALF TO D. T. HEDGES, OF SIOUX CITY, IOWA.

METHOD OF WELDING METALS BY ELECTRICITY.

SPECIFICATION forming part of Letters Patent No. 434,017, dated August 12, 1890.

Application filed November 15, 1889. Serial No. 330,393. (No model.)

*To all whom it may concern:*

Be it known that I, HERBERT E. FOWLER, a citizen of the United States, residing at New Haven, in the county of New Haven and State of Connecticut, have invented certain new and useful Improvements in Welding Metal, of which the following is a specification.

My invention relates to the art of welding metal by the aid of electricity.

It is common to heat metals for the purpose of welding them by the aid of an electric current, and many patents have been taken out and many plans have been tried for effecting the welding of metals by bringing the parts to be joined into contact and then fusing the metal at the joint by means of an electric current. It has been proposed to hold the two pieces of metal to be joined in clamps, one or both of which are movable, so as to force the ends of the parts together when heated, and thereby upset them. It has also been proposed to cause the two parts to overlap at the point of weld.

One radical defect exists in all methods of electrical welding with which I am familiar, and this defect may be stated as follows: The two pieces of metal to be joined being held in alignment by clamps, pressure is exerted upon one or both of the pieces, and the current, being turned on, heats the parts to be joined at a point midway between the clamps. It has been observed that, although the metal may be heated to a white heat by the current at this point, the parts under treatment may be handled with the bare hands at a short distance—say six inches from the heated point. If two pieces of metal be held in the clamps, each piece projecting through one-half the space between the two clamps so as to touch, the point of contact will be the point which is first heated and which receives the greatest heat. Now, according to my observation and experience, if the joint be worked and then the current is stopped, it will be found that the weakest part will be at the joint, and the same principle holds true if the two parts be moved in the clamp after the weld has been made, so that their junction is at one side of the center line between the clamps, in which case the metal would still heat at this center line, and when the current is turned off it has been found that the part thus heated would be weakened at that point. It is evident that if the above proposition is true electrical welding cannot be completely successful when produced according to the present methods.

I propose to utilize an electric current for the purpose of heating the parts to be joined, and then after turning off the current to maintain them in the heated condition or further heat them by the use of supplemental external heating means until the metal at the joint becomes thoroughly fused. The effect of this supplemental heating is to destroy the weakening effect of the electric current, to cause the metal to flow and fuse, and to render the parts joined practically homogeneous throughout. It may be found expedient to work the joint by hammering or rolling or otherwise; but the welding performed by my method is not dependent upon such working.

In carrying out my invention I may proceed as follows: The two parts to be joined are secured in clamps, one of which is movable toward the other, and the parts having their ends in contact. The parts are then joined by suitable wires in an electrical circuit including a source of electricity. The current expends its force upon the metals to be joined at the point of contact, supposing this point to be midway between the clamps, and the ends of the parts can thus be heated to a white heat. When the welding heat has been reached, the supplemental heating means are brought into action, either before or after the current is turned off. The means for maintaining or increasing the heat generated by the electric current may comprise any flame, such as the burning vapor of gas, oil, or the like; and for the better directing of the heat upon the work I prefer to use an air-blast which shall mingle with the products of combustion and direct the flame to the desired point. During this supplemental heating I move one of the clamps so as to upset the ends of the parts at the point of junction, and subsequently I preferably hammer or roll the work at the point of weld, and this may be done in any of the well-known ways. The clamps may be stationary, and the parts may be moved in other ways to upset their ends.

In the accompanying drawings, Figure 1 shows a general plan of the means above mentioned for holding the parts to be joined and effecting the welding thereof, and comprises a pair of clamps, (shown in side elevation,) a storage-battery, and wires leading therefrom to the respective clamps, and a portion of the pipe system for delivering the external heat. Fig. 2 is an end elevation of one of the clamps and showing means for separating its jaws, whereby the parts may be removed after the weld is effected; and Fig. 3 is a section on line 3 3 of Fig. 1, looking in the direction of the arrow.

In the drawings, A A' represent the parts to be welded, which may be two bars, sheets, rods, or tubes of metal. These parts are held, respectively, in clamps, which consist of the clamping-jaws B B', one of which will preferably be movable, so as to permit of the insertion and removing of the work. These clamps are joined in an electric circuit by the wires C C', which are connected to the respective poles of a source of electricity—as, for example, the storage-battery D. One of the clamps may be adapted to slide on the base E to upset the parts, and for that purpose the shifting-lever F is shown.

G represents the pipe for conveying gas to the burner $g$, and H represents a pipe by which a blast of air is directed through the burner, and thereby causes the flame to impinge directly upon the work.

Suppose now that it be desired to weld the two pieces of metal A A'. They may be secured, as illustrated in Fig. 1, with their ends in contact, whereby the circuit is closed and an intense heat generated at the junction of the parts. This heat may be carried to any degree desired, but preferably to a welding heat, when the supplemental heat is brought into action by the ignition of the vapor at the burners $g$. The current may be turned off simultaneously with the application of the external heat or immediately before or after such application. The work is then taken up by the supplemental heat, and the metal is maintained at the heat generated by the electric current or carried beyond this point, as occasion may require, and for such length of time as will enable the thorough fusing of the parts, and this may be aided by working the joint, as before mentioned. It may be found expedient to carry the heating of the metals by the electric current alone to a less degree than the welding-point and to supplement this by other heating, or it may be found expedient to carry the heating by the said current to a point beyond welding, and then to remove the parts from the clamps and subject them at the point of weld to the action of heat produced in any convenient way or from any fuel.

I do not confine my invention to any particular means for carrying out the method herein described, and have described only one of the many forms of apparatus for working. The order of working may also be changed.

I claim—

1. The method of welding metals by the aid of electricity, which consists in holding the parts to be welded in contact and causing an electric current to traverse the joint, then cutting off the electric current and applying external heat to complete the welding.

2. The method of welding metals by the aid of electricity, which consists in holding the parts to be welded in contact and causing an electric current to traverse the joint, then cutting off the electric current and applying external heat and pressure to complete the welding.

3. The method of welding metals by the aid of electricity, which consists in holding the parts to be welded in contact and causing an electric current to traverse the joint, then cutting off the electric current and applying external heat and pressure and working the joint by rollers or hammers to complete the weld.

HERBERT E. FOWLER.

Witnesses:
C. C. LINTHICUM,
FREDERICK C. GOODWIN.